United States Patent
Baldemair et al.

(10) Patent No.: US 9,379,864 B2
(45) Date of Patent: Jun. 28, 2016

(54) REFERENCE SIGNAL GENERATION TECHNIQUE

(75) Inventors: Robert Baldemair, Solna (SE); Stefano Sorrentino, Solna (SE)

(73) Assignee: Telefonaktiebolaget L M Ericsson, Stockholm (SE)

( * ) Notice: Subject to any disclaimer, the term of this patent is extended or adjusted under 35 U.S.C. 154(b) by 148 days.

(21) Appl. No.: 14/236,187

(22) PCT Filed: Aug. 5, 2011

(86) PCT No.: PCT/EP2011/003942
§ 371 (c)(1),
(2), (4) Date: Jan. 30, 2014

(87) PCT Pub. No.: WO2013/020565
PCT Pub. Date: Feb. 14, 2013

(65) Prior Publication Data
US 2014/0192756 A1     Jul. 10, 2014

(51) Int. Cl.
  *H04W 4/00*   (2009.01)
  *H04L 5/00*   (2006.01)
  *H04L 27/26*  (2006.01)

(52) U.S. Cl.
  CPC .............. *H04L 5/0048* (2013.01); *H04L 5/001* (2013.01); *H04L 5/0039* (2013.01); *H04L 5/0051* (2013.01); *H04L 5/0073* (2013.01); *H04L 5/0094* (2013.01); *H04L 27/2613* (2013.01)

(58) Field of Classification Search
  CPC ..................................................... H04W 28/04
  USPC .......................................................... 370/329
  See application file for complete search history.

(56) References Cited

U.S. PATENT DOCUMENTS

| | | | | |
|---|---|---|---|---|
| 2007/0195690 | A1* | 8/2007 | Bhushan et al. | 370/208 |
| 2010/0027483 | A1* | 2/2010 | Ofuji et al. | 370/329 |
| 2011/0051822 | A1* | 3/2011 | Chang et al. | 375/259 |

FOREIGN PATENT DOCUMENTS

| | | |
|---|---|---|
| CN | 102 036 297 A1 | 4/2011 |
| WO | 2008094014 A3 | 4/2009 |
| WO | 2010054693 A1 | 5/2010 |

OTHER PUBLICATIONS

3GPP TSG-RAN Meeting #64 R1-111214; CR0273; Taipei, Taiwan, Feb. 21, 2011, Corrections to Rel-10 LTE-Advanced features in 36.213, Source: Ericsson consisting of 105-pages.

(Continued)

*Primary Examiner* — Christopher R Crompton
(74) *Attorney, Agent, or Firm* — Patents on Demand, P.A.; Brian K. Buchheit; Scott M. Garrett

(57) ABSTRACT

A technique for generating a reference signal for use in a communication system in which for reference signal generation multiple base sequences are defined is presented. A method implementation of the technique comprises generating a first reference signal sequence from a first base sequence and a second reference signal sequence from a second base sequence. A reference signal is generated that comprises the first reference signal sequence and the second reference signal sequence. The first reference signal sequence occupies a first spectral fragment of the reference signal, and the second reference signal sequence occupies a second spectral fragment of the reference signal. The second spectral fragment and the first spectral fragment do not overlap.

25 Claims, 6 Drawing Sheets

(56) References Cited

OTHER PUBLICATIONS

3GPP TSG-RAN Meeting #64 R1-111215; CR102; Taipei, Taiwan, Feb. 21, 2011, Corrections to Rel-10 LTE-Advanced features in 36.213, Source: Qualcomm Inc consisting of 73-pages.

3GPP TSG-RAN Meeting #64 R1-111216; CR0273; Taipei, Taiwan, Feb. 21, 2011, Corrections to Rel-10 LTE-Advanced features in 36.213, Source: Motorola Mobility consisting of 106-pages.

NEC Group et al: "Mapping of UL RS sequence for clustered DFT-S-OFDM", 3GPP Draft; R1-094733, 3rd Generation Partnership Project (3GPP), Mobile Competence Centre ; 650, Route Des Lucioles ; F-06921 Sophia-Antipolis Cedex ; France, no. Jeju; 20091109, Nov. 9, 2009, XP050389130, [retrieved on Nov. 3, 2009].

LG Electronics: "CM Increase for PUCCH/DM RS in Non-contiguous Allocation", 3GPP Draft; R1-100658_LG_ULDMRS_CM, 3rd Generation Partnership Project (3GPP), Mobile Competence Centre ; 650, Route Des Lucioles ; F-06921 Sophia-Antipolis Cedex ; France, vol. RAN WG1, no. Valencia, Spain; 20100118, Jan. 12, 2010, XP050418255, [retrieved on Jan. 12, 2010].

International_Search_Report and Written Opinion dated Jun. 21, 2012 for International Application No. PCT/EP2011/003942, International Filing Date: Aug. 5, 2011 consisting of 10-pages.

\* cited by examiner

REFERENCE SIGNAL GENERATION TECHNIQUE

TECHNICAL FIELD

The present disclosure generally relates to a technique for generating a reference signal for use in a communication system in which for reference signal generation multiple base sequences are defined. The present disclosure further relates to a channel estimation technique that is based on such a reference signal.

BACKGROUND

Reference signals, sometimes also called pilot signals, are widely used in modern communication systems. For example, in communication systems conforming to the Long Term Evolution (LTE) standard of the $3^{rd}$ Generation Partnership Project (3GPP) reference signals are employed, inter alia, for channel estimation purposes and uplink channel quality signalling.

In the LTE uplink from a user terminal to a base station (in the LTE terminology also denoted as User Equipment, or UE, and evolved Node B, or eNodeB, respectively), so called Demodulation Reference Signals (DMRSs) are transmitted. In the absence of uplink data, the user terminal transmits the DMRS in the Physical Uplink Control Channel (PUCCH). Otherwise, the DMRSs are multiplexed with the uplink data and transmitted together with the uplink data in the Physical Uplink Shared Channel (PUSCH). The base station uses the DMRSs in a channel estimation process that is followed by coherent detection and coherent demodulation as generally known in the art.

Reference signals such as DMRSs are typically generated from sequences of individual sequence elements. Possible sequences have to fulfil certain criteria to be suitable for reference signal generation. For example, to permit efficient channel estimation, the sequences should have a flat frequency domain representation. Moreover, the sequences should have favourable auto- and cross-correlation properties. Specifically, a sequence with a periodic auto-correlation function that is zero in case the sequence is correlated with a cyclically shifted version thereof (and non-zero in case of a zero shift) would be desirable. The latter means that cyclically shifted versions of the sequence are orthogonal to each other, so that multiple orthogonal sequences can be derived from a single base sequence.

One set of base sequences that satisfies these (and further) criteria in an adequate manner are so-called Zadoff-Chu sequences. Zadoff-Chu sequences are used as base sequences for reference signal generation in LTE communication systems (see section 5.5.1.1 of 3GPP Technical Specification (TS) 136.211 V8.9.0 (2010 January) LTE; Evolved Universal Terrestrial Radio Access (E-UTRA); Physical channels and modulation).

The actual reference signal sequence assigned by a base station to a specific user terminal is defined in the LTE standard by a specific cyclic shift of a given Zadoff-Chu base sequence (see section 5.5.1 of 3GPP TS 136.211). The fact that multiple orthogonal sequences are obtainable by impressing different shifts on a given base sequence is exploited in the LTE uplink to reduce the interference between the resulting reference signals.

A further possibility to combat interference introduced with LTE Release 10 are Orthogonal Cover Codes (OCCs). The OCC approach is based on orthogonal time domain codes and operates on the two reference signals transmitted for each LTE sub-frame in the uplink. By means of the OCC code [1 −1], an interfering reference signal can be suppressed as long as its contribution (after a matched filter of the base station) is identical on both reference signals of the same sub-frame. Similarly, the OCC code [1 1] is able to suppress an interfering reference signal as long as its contribution has opposite signs with respect to the two reference signals of the same sub-frame.

In the LTE standard, a specific DMRS is defined by four parameters. In addition to a cyclic shift parameter, a sequence group parameter and a sequence-within-group parameter are defined that jointly define a specific base sequence. Moreover, a sequence length parameter is defined to provide support for different transmission bandwidths in the uplink resource allocation. Different cyclic shifts of a given base sequence are assigned to different user terminals within a cell, whereas different sequence groups (and thus different base sequences) are used in neighbouring cells. While base sequences are assigned in a semi-static manner, cyclic shifts and OCCs are each mobile terminal-specific and dynamically assigned as part of the scheduling grant for each PUSCH transmission.

Simultaneous uplink resource allocations on neighbouring cells can have different transmission bandwidths and can be only partially overlapping in frequency. This fact prevents efficient optimization of reference signal cross-correlation between cells because orthogonality among the reference signals is lost when the transmission bandwidths of the reference signals differ. Orthogonality is also lost when the reference signals are generated from different base sequences (in such a case only "semi-orthogonality" can be achieved). As is readily apparent, a loss of orthogonality among reference signals increases the mutual interference.

To "randomize" inter-cell interference for reference signals, multiple hopping approaches have been defined in the LTE standard. The (pseudo-random) hopping patterns are cell specific and derived from the physical layer cell identity. For PUSCH and PUCCH, LTE supports cyclic shift hopping, sequence group hopping and sequence-within-group hopping. The latter two hopping approaches are jointly also referred to as Sequence/Group Hopping (SGH).

It has been found that the interference situation regarding reference signals strongly depends on the deployment and configuration of the communication systems as will now be described in more detail, again with exemplary reference to such communication systems that conform to the LTE standard.

Existing and upcoming realizations of LTE communication systems will include macro deployments, Heterogeneous Network (HetNet) deployments and Hotspot deployments. In a macro deployment, large cells are typically divided into independent sectors. In HetNet scenarios so-called pico cells are deployed within the coverage area of a macro cell (e.g, to improve coverage for high data rate applications). In a Hotspot implementation an access point serves a small coverage area with a high data throughput need.

LTE communication systems can also be designed with the aim of enabling optional Coordinated Multipoint Processing (CoMP) techniques, according to which different cell sectors or cells operate in a coordinated way (e.g., in terms of scheduling or processing). As an example, in the LTE uplink a signal originating from a single user terminal may be received by multiple receivers in different cell sectors or cells, and may then be jointly processed in order to improve the link quality. Uplink CoMP allows transformation of what traditionally is regarded as inter-cell interference into a useful signal.

One of the main innovations in the uplink for LTE Release 10 is the introduction of multi-antenna techniques for further increasing the data rate and communication reliability. The performance increase is highest in case both the transmitter and the receiver are equipped with multiple antennas (Multiple-Input Multiple-Output, or MIMO).

LTE Release 10 supports in the uplink Single-User MIMO (SU-MIMO). SU-MIMO is a spatial multiplexing mode in which a high rate signal is split into multiple lower rate data streams and each data stream ("layer") is transmitted from a different transmit antenna in the same transmission bandwidth. Techniques such as linear precoding are employed by the user terminal to differentiate the layers in the spatial domain and allow a recovery of the transmitted data streams at the base station.

Another MIMO mode supported by LTE Release 10 is Multi-User MIMO (MU-MIMO) in which multiple user terminals belonging to the same cell are partly co-scheduled in the same transmission bandwidth and time slots. Each user terminal in the MU-MIMO mode may possibly transmit multiple layers, thus additionally operating in the SU-MIMO mode.

In case of SU-MIMO it is necessary to allow the receiver to estimate the equivalent channel associated with each transmitted layer (of possibly each user terminal) to allow detection of all data streams. In a CoMP scenario this requirement also applies to user terminals belonging to other cells but included in a joint processing cluster. Therefore, each user terminal needs to transmit a unique reference signal sequence at least for each transmitted layer. The base station is aware of the assignments between layers and reference signal sequences and performs layer-based channel estimation based thereon. The resulting channel estimate is then employed in the coherent detection process.

In case of MU-MIMO the user terminals may be scheduled on fully or partially overlapping transmission bandwidths. Depending on the particular MU-MIMO configuration, different requirements for reference signal generation result. For MU-MIMO within a cell and in case of fully overlapping transmission bandwidths, the reference signals of different user terminals may be multiplexed by means of cyclic shifts and/or OCCs. SGH may additionally be employed without affecting the orthogonality. For MU-MIMO within a cell and partially overlapping transmission bandwidths, the reference signals of different user terminals can be multiplexed by OCCs only, and SGH cannot be enabled for any of the user terminals. In the case of MU-MIMO for user terminals belonging to different cells (e.g., in a CoMP scenario), the user terminals are typically assigned different base sequences, and orthogonality can generally not be achieved.

Assuming an exemplary HetNet deployment, the small cell radius of the pico cell and the geographic location within a macro cell implies the presence of potentially strong interference between user terminals belonging to those cells. On the other hand, cell densification, increasing number of receive antennas and optional CoMP processing emphasize the need for flexible MU-MIMO scheduling.

In the scenarios described above it is generally not desirable to disable SGH and enhance the risk of inter-cell interference peaks. On the other hand, MU-MIMO is in most cases not efficient in conjunction with SGH if the user terminals within a specific MU-MIMO group are assigned different base sequences because neither cyclic shifts nor OCCs are effective in such a case, and thus only semi-orthogonality can be obtained.

One solution could be to assign the same base sequence (and consequently the same SGH pattern) to interfering cells such as macro cells and micro cells within macro cell coverage. However, this solution has its drawbacks, such as reduced SGH randomization, unpredictable large interference peaks generated when user terminals using the same base sequence are scheduled on partly overlapping transmission bandwidths, and reference signal capacity limitations. The capacity limitations result from the fact that only cyclic shifts and OCCs may be used for reference signal orthogonalization over the aggregated cells.

An alternative solution would be to disable SGH in a user terminal-specific manner as enabled in LTE Release 10. However, this solution has its drawbacks in case user terminals of LTE Release 8 or 9, for which SGH can only be enabled (and disabled) on a cell-basis, co-exist with user terminals conforming to LTE Release 10 in the same communication system. The co-existance implies that SGH can only be disabled in a cell-specific way also for user terminals conforming to LTE Release 10, which may result in a severe degradation of inter-cell interference.

SUMMARY

There is a need for a reference signal generation approach that helps to reduce interference between reference signals in any of the above or other scenarios.

According to a first aspect, a method of generating a reference signal for use in a communication system in which for reference signal generation multiple-base sequences are defined is provided, wherein the method comprises generating a first reference signal from a first base sequence, generating a second reference signal from a second base sequence, and generating a reference signal comprising the first reference signal sequence and the second reference signal sequence, wherein the first reference signal sequence occupies a first spectral fragment of the reference signal and the second reference signal sequence occupies a second spectral fragment of the reference signal, and wherein the second spectral fragment and the first spectral fragment do not overlap.

The first base sequence may be different from the second base sequence. In certain scenarios, the first base sequence may also be identical with the second base sequence. Generating a specific reference signal from a specific base sequence may involve one or more processing steps that are applied to the base sequence. Those processing steps may aim at an orthogonalization among multiple reference signals transmitted in the communication system.

The method may further comprise determining spectral information defining at least one of spectral sizes and spectral positions of the first spectral fragment and the second spectral fragment in a spectral bandwidth covered by the reference signal. The spectral information may be taken into account during reference signal generation.

For a specific communication system, a particular resource mapping scheme may be defined based on elementary or aggregated resource chunks such as resource blocks. In such a case, the reference signal may extend in a spectral dimension over one or multiple resource blocks, and the spectral information may be defined by resource block indices.

The spectral information taken into account when generating the reference signal may be derived in various ways. In one implementation, the spectral information is received in a resource allocation message or otherwise from a base station or any other network node. The resource allocation message may be of a message type that defines for a transmission channel of the reference signal at least one of a transmission channel bandwidth and a spectral position of the transmission channel within a larger spectrum (such as within a system bandwidth).

The reference signal may have a spectral bandwidth that coincides with a transmission channel bandwidth that is used for data transmissions. In an exemplary LTE implementation, the reference signal may thus have a spectral bandwidth that corresponds to a PUSCH bandwidth. The spectral bandwidth of the reference signal may be contiguous or non-contiguous. In a non-contiguous scenario, the spectral bandwidth of the reference signal comprises two or more bandwidth portions separated from each other in the spectral dimension.

The method may further comprise determining assignment information that assigns at least one of the first base sequence and the second base sequence to the respective spectral fragment. The assignment information may be taken into account upon generating at least one of the first and second reference signal sequences and the reference signal. The assignment information may, for example, define a mapping between base sequences and spectral fragments. As mentioned above, the spectral fragments may be defined by spectral information, so that the assignment may also provide a mapping between individual base sequences and associated spectral information.

The assignment information may be received (optionally together with the spectral information) in a resource allocation message or otherwise. As mentioned above, a resource allocation message may define for a transmission channel of the reference signal at least one of a transmission channel bandwidth and a spectral position of the transmission channel.

Generating the first reference signal sequence and the second reference signal sequence may comprise applying at least one of a cyclic shift and an OCC to the first base sequence and the second base sequence, respectively. The corresponding cyclic shift parameter and/or OCC parameter may be received together with the assignment information. It should be noted that the cyclic shift parameter could be indicative of a zero shift or a non-zero shift.

It should also be noted that a cyclic shift hopping may be performed, so that the steps of generating the first reference signal sequence and generating the second reference signal sequence could comprise applying a specific cyclic shift hopping pattern in each case. One or more parameters defining the cyclic shift hopping pattern may be received together with the assignment information.

The steps of generating the first reference signal sequence and generating the second reference signal sequence could also comprise applying at least one of a sequence group hopping pattern and a sequence-within-group hopping pattern to determine the first base sequence and the second base sequence, respectively. In one realization, the first reference signal sequence is associated with at least one of a first sequence group hopping pattern and a first sequence-within-group hopping pattern. The second reference signal sequence may be associated with at least one of a second sequence group hopping pattern and a second sequence-within-group hopping pattern different from the first sequence group hopping pattern and the first sequence-within-group hopping pattern, respectively. It should be noted that the one or more parameters defining the sequence group hopping pattern and the sequence-within-group hopping pattern may be received together with the assignment information, optionally together with one or both of the cyclic shift parameters and OCC parameters. As such, a specific base sequence and a set of reference signal parameters may be assigned to each spectral fragment.

The method may further comprise generating at least a third reference signal sequence based on at least a third base sequence. In such a case the reference signal may be generated from the first reference signal sequence, the second reference signal sequence and the third reference signal sequence, with the third reference signal sequence occupying a third spectral fragment of the reference signal that does not overlap with the first spectral fragment and the second spectral fragment.

According to a further aspect, a method of performing channel estimation based on a reference signal in a communication system in which for reference signal generation multiple base sequences are defined is provided, wherein the method comprises receiving a reference signal comprising a first reference signal sequence generated from a first base sequence and a second reference signal sequence generated from a second base sequence, wherein the first reference signal sequence occupies a first spectral fragment of the reference signal and the second reference signal sequence occupies a second spectral fragment of the reference signal, and wherein the second spectral fragment and the first spectral fragment do not overlap, and performing channel estimation based on the received reference signal and based on at least one of the first reference signal sequence and the second reference signal sequence.

Channel estimation may comprise applying a matched filter to the received signal. The matched filter may be based on at least one of the first reference signal sequence and the second reference signal sequence. In one implementation, the matched filter is constructed based on both the first reference signal sequence and the second reference signal sequence. The first reference signal sequence and the second reference signal sequence may a prior, be known to the apparatus receiving the reference signal.

The method may further comprise allocating at least one of spectral sizes and spectral positions to the first spectral fragment and the second spectral fragment and transmitting spectral information indicative of the spectral allocation to a reference signal generator. The spectral information may be transmitted via one or more scheduling grants (e.g., in a resource allocation message). The spectral information may be changed or updated dynamically for individual transmissions.

The method may further comprise assigning at least one of the first base sequence and the second base sequence to the respective spectral fragment, and transmitting assignment information indicative of the sequence assignment to a reference signal generator. The assignment information may be sent in a resource allocation message, and the sequence assignment may be performed semi-statically.

In one realization, a control instruction is transmitted to the reference signal generator. The control instruction is adapted to instruct the reference signal generator to switch from regular reference signalling to enhanced reference signalling, or vice versa. In regular reference signalling, the reference signal is generated from a single reference signal sequence, whereas in enhanced reference signalling, the reference signal is generated from (at least) the first reference signal sequence and the second reference signal sequence as discussed herein.

A transmitter of a fragmented reference signal ("enhanced reference signalling") and a transmitter of a non-fragmented reference signal ("regular reference signalling") may be co-scheduled on at least partly overlapping transmission bandwidths. In such a case, the non-fragmented reference signal may comprise a single reference signal sequence that has been generated from one of the first base sequence and the second base sequence. Moreover, the transmission bandwidth of the non-fragmented reference signal may coincide with the spectral position and spectral size of one of the first spectral fragment and the second spectral fragment. The non-fragmented reference signal and the associated coinciding spectral fragment of the fragmented reference signal may have been generated based on the same base sequence but may be orthogonal to each other (e.g., due to different cyclic shifts).

According to a still further aspect, a computer program product comprising program code portions for performing the steps of any of the methods or methods aspects discussed herein when the computer program product is executed on a computing device is provided. The computer program product may be stored on a computer-readable recording medium such as a CD-ROM, DVD or semiconductor memory. The computer program product may also be provided for download via a wired or wireless connection.

Also provided is an apparatus for generating a reference signal for use in a communication system in which for reference signal generation multiple base sequences are defined. The apparatus comprises a sequence generator adapted to generate a first reference signal sequence from a first base sequence and a second reference signal sequence from a second base sequence, and a reference signal generator adapted to generate a reference signal comprising the first reference signal sequence and the second reference signal sequence, wherein the first reference signal sequence occupies a first spectral fragment of the reference signal and the second reference signal sequence occupies a second spectral fragment of the reference signal, and wherein the second spectral fragment and the first spectral fragment do not overlap.

The apparatus generating the reference signal may be comprised in a stationary or mobile terminal. For example, the apparatus may be comprised in a mobile telephone, Smartphone, tablet computer or personal computer.

Also provided in an apparatus for performing channel estimation based on a reference signal in a communication system in which for reference signal generation multiple base sequences are defined, wherein the apparatus comprises a receiver adapted to receive a reference signal comprising a first reference signal sequence generated from a first base sequence and a second reference signal sequence generated from a second base sequence, wherein the first reference signal sequence occupies a first spectral fragment of the reference signal and the second reference signal sequence occupies a second spectral fragment of the reference signal, and wherein the second spectral fragment and the first spectral fragment do not overlap. The apparatus further comprises a channel estimator adapted to perform channel estimation based on the received reference signal and based on at least one of the first reference signal sequence and the second reference signal sequence.

The apparatus performing channel estimation may be comprised in a base station. The base station may be configured as an eNodeB.

Also provided is a communication system comprising at least one of the apparatus configured generating the reference signal and the user terminal comprising this apparatus, and at least one of the apparatus performing channel estimation and the base station comprising such an apparatus. The communication system may be configured to operate in accordance with at least one of LTE Release 10, 11 or higher Releases.

BRIEF DESCRIPTION OF THE DRAWINGS

Further details, aspects and advantages of the present disclosure will become apparent from the following description of exemplary embodiments in conjunction with the accompanying drawings, wherein.

DETAILED DESCRIPTION

In the following description, for purposes of explanation and not limitation, specific details are set forth, such as specific apparatus configurations, specific signalling and specific bandwidth partitioning scenarios, in order to provide a thorough understanding of the present disclosure. It will be apparent to one skilled in the art that the technique presented herein may be practised in other embodiments that depart from these specific details. While certain embodiments will, for example, be described with reference to the 3GPP LTE standard using LTE and LTE-Advanced terminology, it will be understood that the technique presented herein can also be practised in communication systems that conform to other standards, such as Wideband Code-Division Multiple Access (WCDMA), Global System for Mobile communication (GSM), WiMax and Ultra Mobile Broadband (UMB) communication systems.

It should also be noted that terminology such as base station or (eNodeB) and user terminal (or UE) should not be considered as limiting, and thus in particular do not imply a certain hierarchical relation between such entities. In general, a "base station" should simply be considered as a first device, and a mobile terminal should simply be considered as a second device, wherein both two device communicate with each other over a radio channel.

Those skilled in the art will further appreciate that the methods, steps and functionalities explained herein may be implemented using individual hardware circuitry, using software functioning in conjunction with a programmed microprocessor or a general purpose computer, using one or more Application Specific Integrated Circuits (ASICs), one or more Digital Signal Processors (DSPs) and/or one or more Field Programmable Gate Arrays (FPGAs). It will also be appreciated that the methods, steps and functionalities disclosed herein may be embodied in a processor and the memory coupled to the processor, wherein the memory stores one or more programs that result in the steps discussed herein being performed than the one or more programs are executed by the processor.

Figure 1:
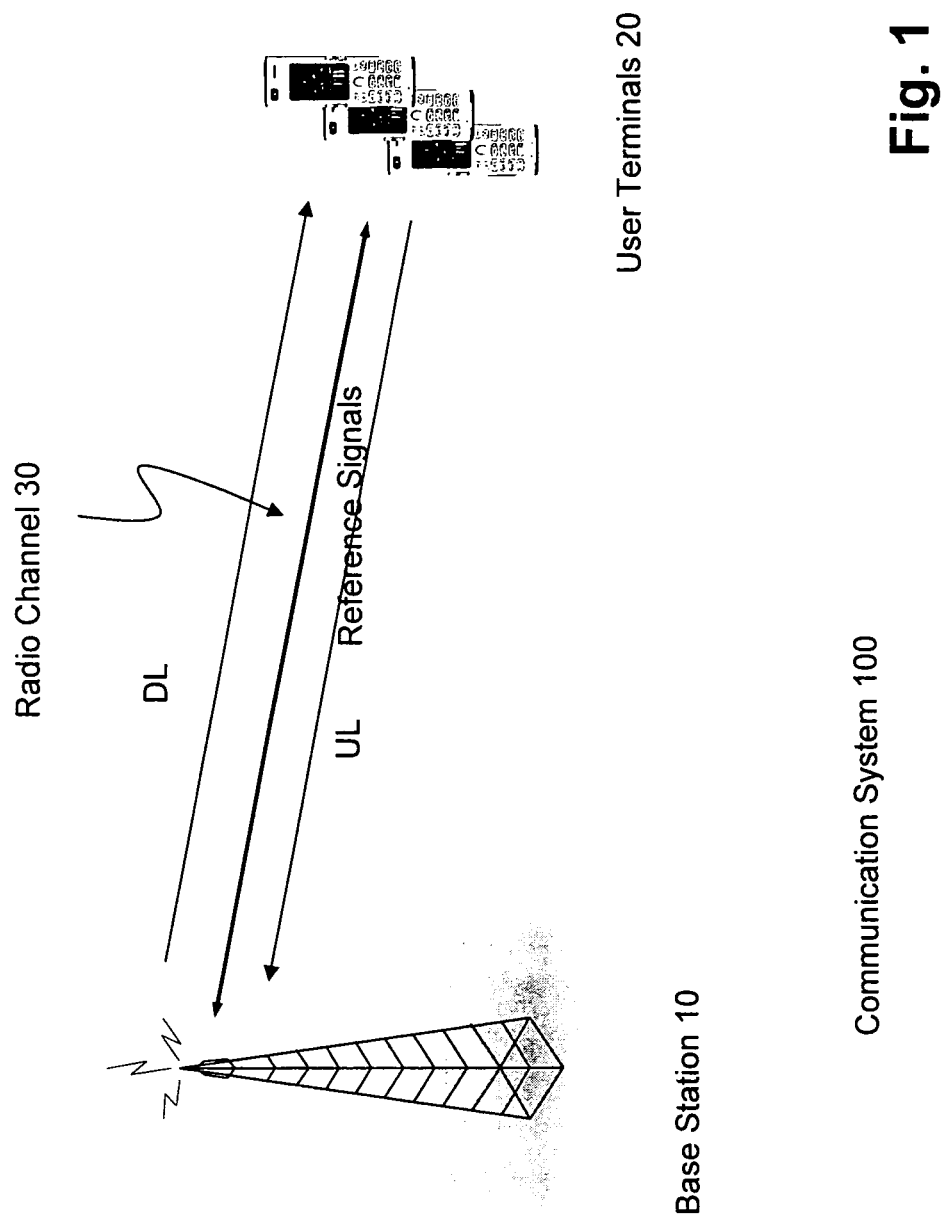
FIG. 1 schematically illustrates a communication system in which the technique disclosed herein can be implemented.

FIG. 1 illustrates an embodiment of a communication system 100 in which the technique presented herein can be implemented. The communication system 100 comprises a base station 10 as well as multiple user terminals 20. A radio channel 30 stretches between the base station 10 and each user terminal 20. The communication link from the base station 10 to an individual user terminal 20 is referred to as Downlink (DL), while the communication link in the opposite direction is referred to as Uplink (UL).

In the following discussion it will be exemplarily be assumed that reference signals will be sent from each of the multiple user terminals 20 to the base station 10 on the uplink. It will be appreciated that reference signals could in principle also be sent from the base station 10 to the user terminals 20 in the downlink. Moreover, in the following description it will be assumed that the reference signals received by the base station 10 in the uplink will be used for channel estimation purposes. Of course, the received reference signals could also be used for other purposes.

In the communication system 100, multiple base sequences for reference signal generation are defined. Each reference signal is generated from a base sequence having Zero Auto-Correlation (ZAC) properties, and preferably Constant Amplitude ZAC (CAZAC) properties. As an example, the base sequence may be a Zadoff Chu sequence or a Generalized Chip-like Polyphase (GCP) sequence. The sequence preferably has periodic auto-correlation properties.

Figure 2:
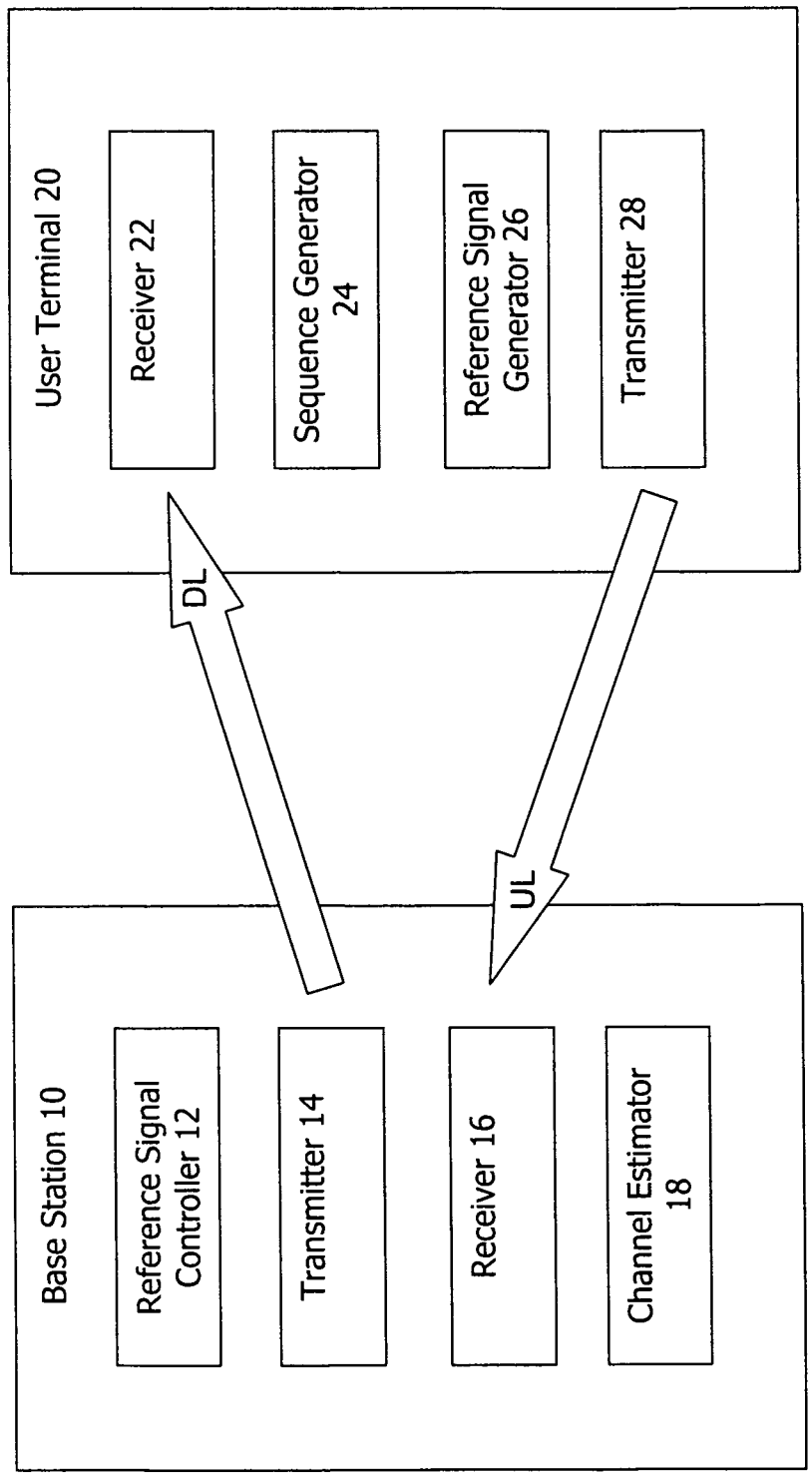
FIG. 2 schematically illustrates a base station embodiment as well as a mobile terminal embodiment.

Embodiments of the base station 10 and of the user terminal 20 of FIG. 1 in the context of reference signal generation and associated channel estimation are shown in FIG. 2. As illustrated in FIG. 2, the base station 10 comprises a reference signal controller 12, a transmitter 14, a receiver 16 and a channel estimator 18. The user terminal 20 comprises a receiver 22, a sequence generator 24, a reference signal generator 26 as well as a transmitter 28.

The operations of the base station 10 and the user terminal 20 in the context of generating a reference signal and in the related context of performing channel estimation based on the generated reference signal will now be described in more detail with reference to the flow diagrams 300, 310 depicted in FIG. 3. Flow diagram 300 illustrates a method embodiment of generating a reference signal for use in the communication system 100 by the user terminal 20. Flow diagram 310 illustrates a method embodiment of performing channel estimation by the base station 10 based on the reference signal received in the uplink (see FIG. 1) from the user terminal 20.

In a preliminary processing stage not illustrated in the flow diagrams 300, 310, the reference signal controller 12 of the base station 10 may define a set of reference signal parameters that control the operation of the sequence generator 24. The reference signal parameters are passed from the reference signal controller 12 to the transmitter 14 of the base station 10 and transmitted in the downlink (e.g., by a resource allocation message or in any other way) to the user terminal 20.

The parameter set transmitted by the base station 10 is received by the receiver 22 of the user terminal 20 and forwarded to the sequence generator 24. The sequence generator 24 then generates one or more reference signal sequences based on the corresponding parameters received from the base station 10. In an exemplary LTE implementation, the reference signal parameters may comprise, for each reference signal sequence to be generated by the sequence generator 24, one or more of a cyclic shift parameter, a sequence group parameter, a sequence-within-group parameter and a sequence length parameter. Additionally, an OCC parameter and one or more hopping parameters may be received.

Figure 3:
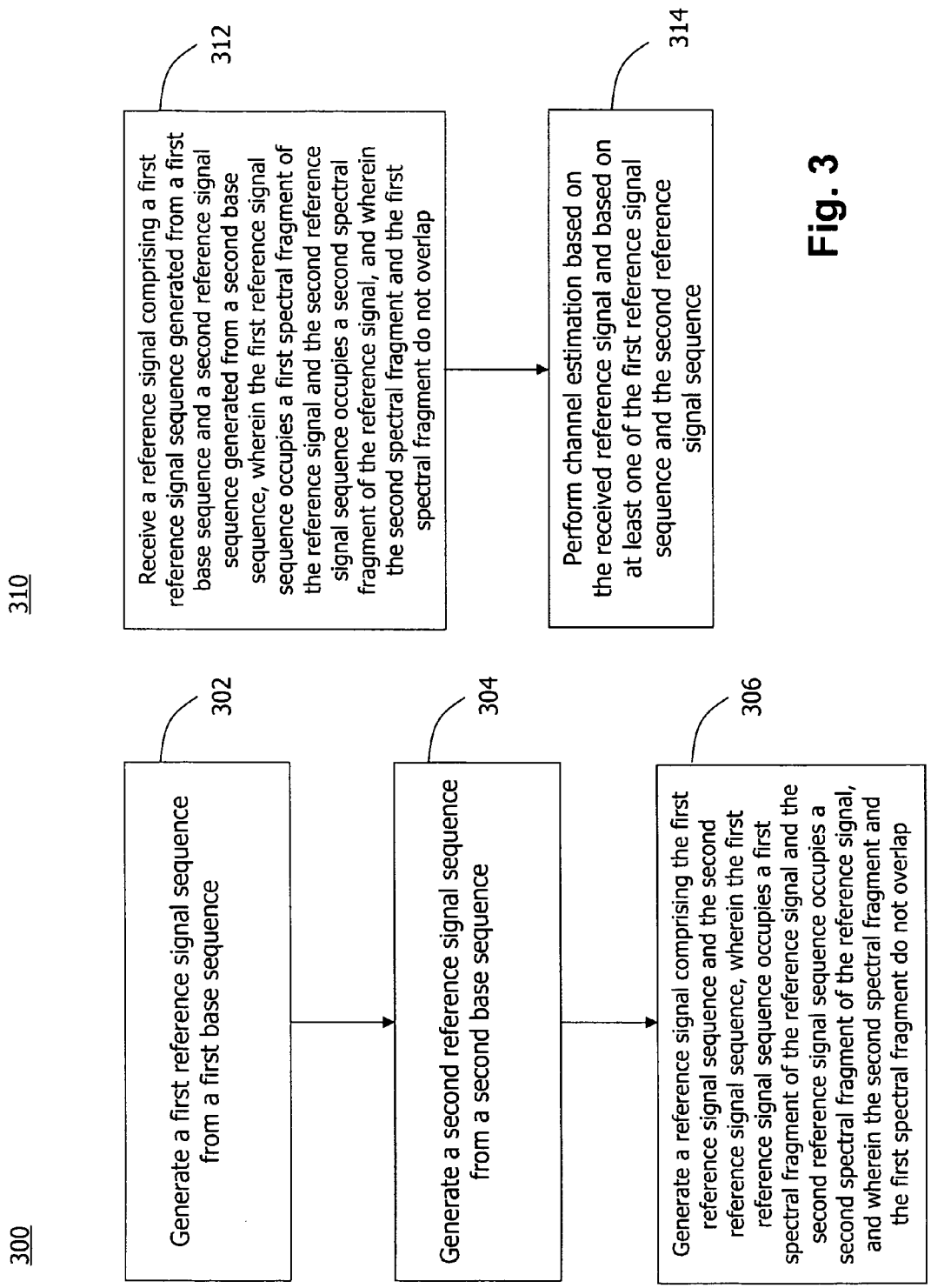
FIG. 3 illustrates two flow diagrams representative of two method embodiments.

With reference to FIG. 3, the operation of the sequence generator 24 starts with generation of a first reference signal sequence from a first base sequence in step 302 followed by generation of a second reference signal sequence from a second base sequence in step 304. As stated above, the first reference signal sequence and the second reference signal sequence may optionally be generated based on the reference signal parameters defined by the reference signal controller 12 of the base station 10.

The sequence generator 24 passes the first reference signal sequence and the second reference signal sequence generated in step 302 and in step 304, respectively, to the reference signal generator 26. The reference signal generator 26 generates, in step 306, a reference signal comprising the first reference signal sequence and the second reference signal sequence. In the reference signal generated by the reference signal generator 26, the first reference signal sequence occupies a first spectral fragment of the reference signal, while the second reference signal sequence occupies a second spectral fragment of the reference signal. The first spectral fragment and the second spectral fragment do not overlap. In other words, the first spectral fragment and the second spectral fragment do not have any common spectral coverage.

The spectral sizes and the spectral positions of the first spectral fragment and the second spectral fragment in a spectral bandwidth covered by the reference signal may be determined by the reference signal generator 26 based on spectral information. The spectral information may have been generated by the reference signal controller 12 and may have been signalled to the reference signal generator 26 together with the reference signal parameters (e.g., in a resource allocation message) or separately therefrom. The reference signal controller 12 may additionally define an assignment between individual base sequences and individual spectral fragments. The corresponding assignment information may likewise be communicated to the reference signal generator 26 either together with the reference signal parameters (e.g., in a resource allocation message) or separately therefrom.

The reference signal generated by the reference signal generator 26 is transmitted by the transmitter 28 in the uplink of radio channel 30 to the base station 10 for channel estimation purposes. During the transmission of the reference signal in the uplink it gets distorted and attenuated by the radio channel 30 and disturbed by noise and interference.

As illustrated in FIG. 3, the receiver 16 of the base station 10 receives in step 312 the noisy and distorted reference signal transmitted by the user terminal 10. The reference signal comprises the first reference signal sequence generated from the first base sequence as well as the second reference signal sequence generated from the second base sequence, wherein the two reference signal sequences occupy spectral fragments that do not overlap.

The receiver 16 passes the reference signal to the channel estimator 18 that performs channel estimation based on the received reference signal and based on at least one of the first reference signal sequence and the second reference signal sequence in step 314. The operation of the channel estimator 18 is based on a matched filter that is applied to the received noisy and distorted reference signal. The matched filter is constructed based on a priori knowledge about the original reference signal (i.e., based on the same information that was generated by the reference signal controller 12 and sent in the downlink to the user terminal 20). After the matched filter operation, the quality of channel estimates can be further improved by filtering in the time and/or frequency domain.

In the following, an implementation of the reference signal generation technique presented herein and generally discussed above with reference to FIGS. 1 to 3 will be described in more detail for an exemplary LTE Release 11 (or other Release) communication system. Specifically, the fragmentation of a DMRS in the frequency domain for a given transmission bandwidth of the PUSCH will be exemplified.

As discussed above, a specific base sequence as well as a set of reference signal parameters may be assigned to each DMRS fragment. The base sequences assigned to a DMRS particular fragment over time may be configured in a semi-static way, while the allocation of DMRS fragments may be performed dynamically. As will become apparent from the embodiments described hereinafter, by choosing the base sequence properly, it is possible to allow reference signal orthogonality of user terminals conforming to LTE Release 11 user mobile terminals conforming to any of LTE Release 8, 9, 10 or 11 and even in a MU-MIMO configuration with different transmission bandwidth allocations. Reference signal orthogonality can be achieve both when SGH is enabled or disabled.

Without a loss of generality, the following discussion is based on a frequency domain representation of the transmitted signals that include the reference signals. It should be understood that equivalent principles can be applied for time domain processing.

Figure 4:
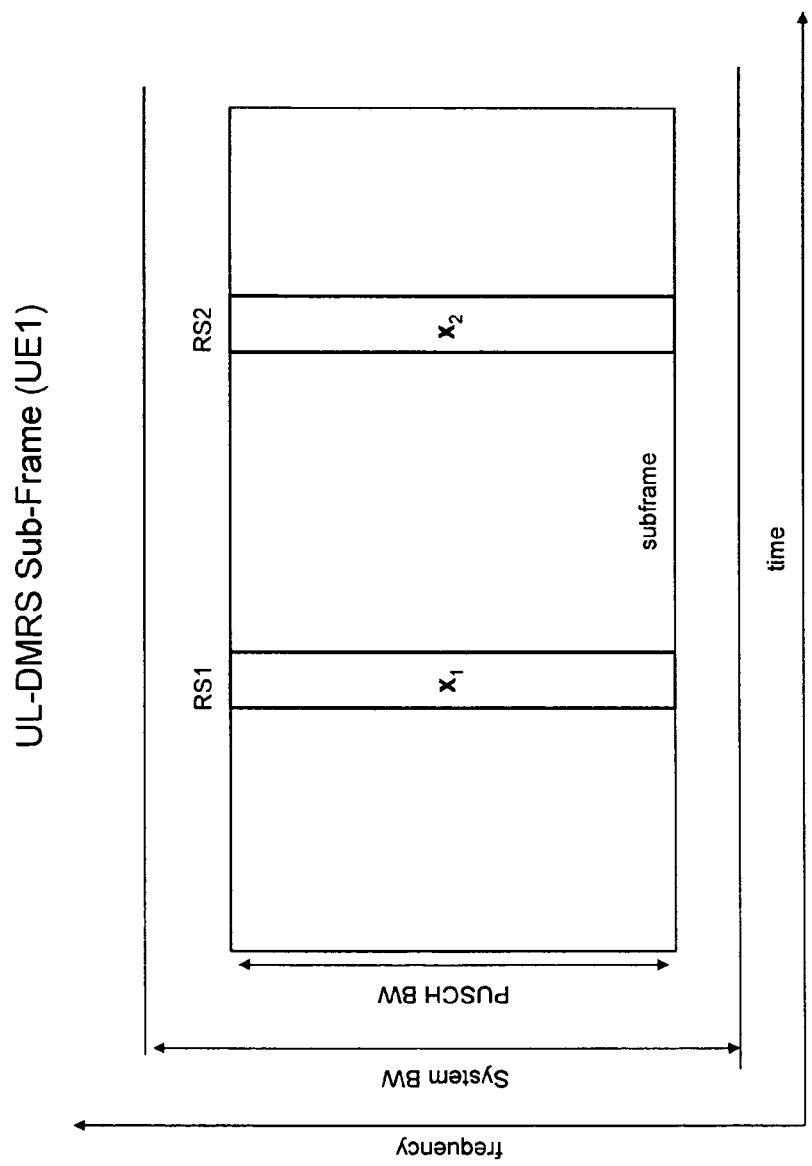
FIGS. 4-6 illustrate embodiments of exemplary fragmented and non-fragmented uplink DMRS sub-frames.

FIG. 4 illustrates a first LTE sub-frame transmitted by a first mobile terminal 20 (UE1) conforming to LTE Release 8, 9 or 10. An LTE sub-frame generally comprises two slots, and one DMRS is provided in each slot. The two DMRSs are referred to as "RS1" and "RS2" in FIG. 4. In FIG. 4, $x_1$ denotes the DMRS for slot 1, while $x_2$ denotes the DMRS for slot 2. In case of a multi-antenna transmission, FIG. 4 illustrates a single transmission layer.

Figure 5:
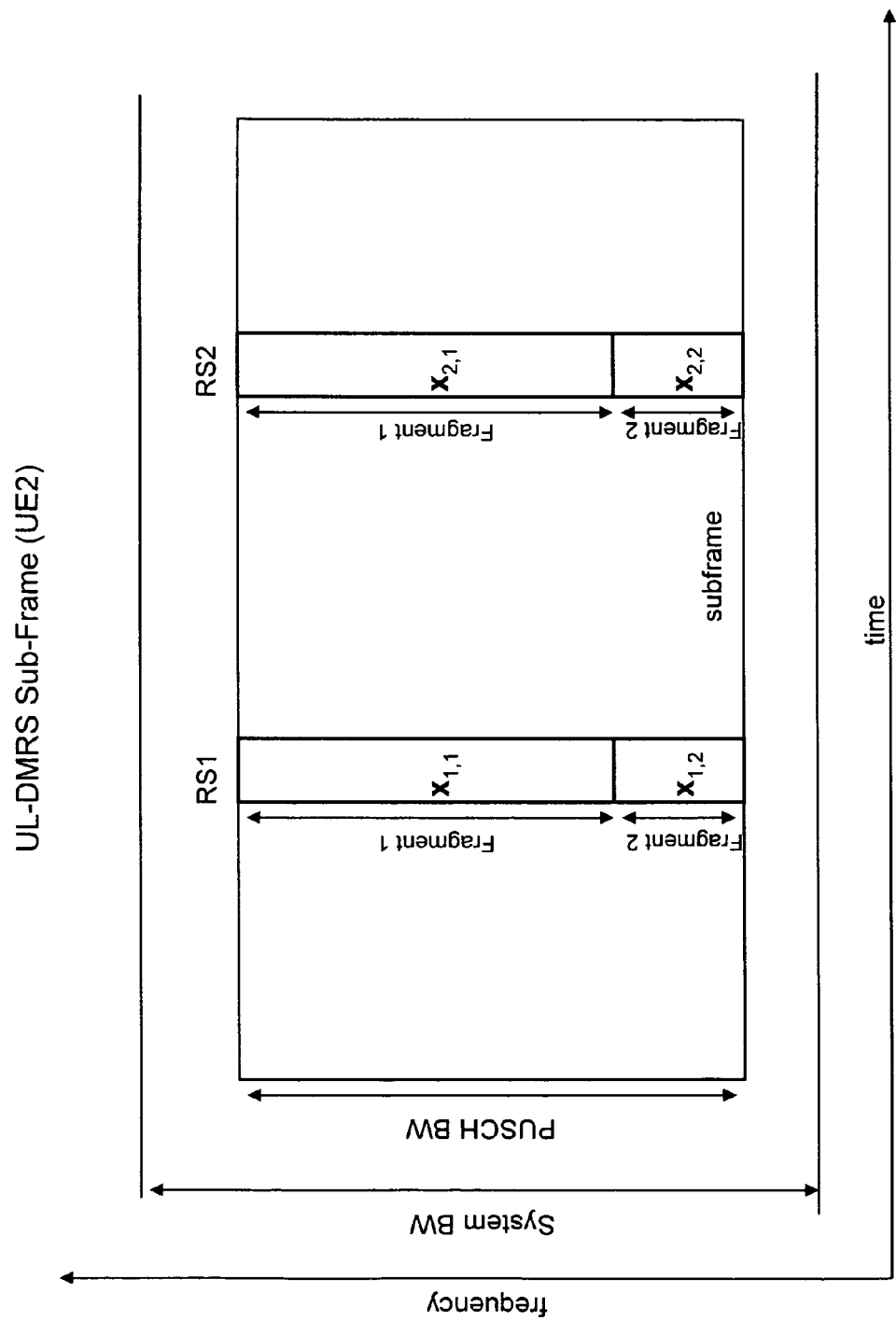

FIG. 5 illustrates a second LTE sub-frame in which each of the two DMRSs has been fragmented in its spectral extension within the PUSCH transmission bandwidth. The second LTE sub-frame is transmitted by a second mobile terminal 20 (UE2) that may generally be configured as illustrated in FIG. 3 and that may generally operate as illustrated in FIG. 4 (flow diagram 300).

As becomes apparent from FIG. 5, the two DMRSs have each being segmented into two spectral fragments. The two spectral fragments of each DMRS do not overlap and are located immediately adjacent to one another. It also becomes apparent from FIG. 5 that each DMRS has a spectral bandwidth that coincides with the transmission channel bandwidth of the PUSCH. The PUSCH bandwidth is located within a larger system bandwidth. Although the exemplary fragmentation illustrated in FIG. 5 is based on two spectral fragments only, three or more fragments could also be used.

In the scenario illustrated in FIG. 5, $x_{n,m}$ indicates the m-th fragment of the reference signal in slot n. Each fragment $x_{n,m}$ has been generated from a dedicated base sequence as follows. A first base sequence A is assigned to the fragment $x_{1,m}$, and a second base sequence B different from the first base sequence A is assigned to the fragment $x_{1,q}$. The actual reference signal sequences for the two fragments $x_{1,m}$ and $x_{1,q}$ are generated by the sequence generator 24 (see FIG. 2) from the first base sequence A and the second base sequence B, respectively, by applying one or more of cyclic shifts, OCCs, SGH and cyclic shift hopping, is generally known in the art.

In case SGH is enabled, the base sequences assigned to the fragments $x_{n,m}$ are assigned to the respective slots n based on the original base sequence A, and the base sequences assigned to the fragment $x_{n,q}$ are assigned to the respective slots n based on the original base sequence B. As an example, SGH mechanisms according to LTE Release 10 may be employed for calculating the respective hopping patterns, with the difference that the sequence shift parameter might be assigned independently for each fragment $x_{n,m}$.

Assuming that SGH is enabled, the sub-frames illustrated in FIGS. 4 and 5 will thus have different base sequences in both slots, wherein fragments $x_1, x_2, x_{1,1}, x_{1,2}, x_{2,1}$ and $x_{2,2}$ are associated with semi-orthogonal base sequences that are pseudo-randomly chosen from a set of predefined sequences. In case SGH is not enabled, the base sequences associated with fragments $x_1$ and $x_2$, $x_{1,1}$ and $x_{2,1}$ and $x_{1,2}$ and $x_{2,2}$ will be same.

Returning to the sub-frame embodiment illustrated in FIG. 5, the indices of the base sequences A, B are assigned to each user terminal 20 by the base station 10 in a semi-static manner. In one implementation, only a subset of such base sequences is assigned, and the remaining base sequences remain at least temporarily unassigned. One of the base sequences might, for example, be the default base sequence that would be employed by a user terminal conforming to LTE Release 10.

The (relative) spectral size and spectral position of each fragment $x_{m,n}$ may be assigned by the base station 10 to each individual user terminal 20 in a dynamic manner (e.g., by a scheduling grants). In the exemplary LTE implementation illustrated in FIG. 5, the corresponding spectral information may be defined in terms of LTE resource blocks using LTE resource block indices.

The spectral information may be transmitted by the base station 10 to the user terminal 20 in the downlink (see FIG. 1) in a resource allocation context (e.g., using a resource allocation message). The corresponding spectral information may in one implementation be encoded in the associated resource allocation field (Resource Indication Value, or RIV, field) which defines the PUSCH bandwidth and frequency position. As such, the RIV field may also be indicative of the spectral information (e.g., the relative sizes) of the DMRS fragments within the PUSCH bandwidth. A portion of corresponding DMRS assignment message may include base sequence-to-fragment mapping information (i.e., assignments between the base sequences A, B and the respective fragments $x_{n,m}$). Furthermore, different granularities in the PUSCH bandwidth and DMRS fragment allocation may be provided in order to satisfy certain requirements such as Downlink Control Information (DCI) message size reduction.

Figure 6:
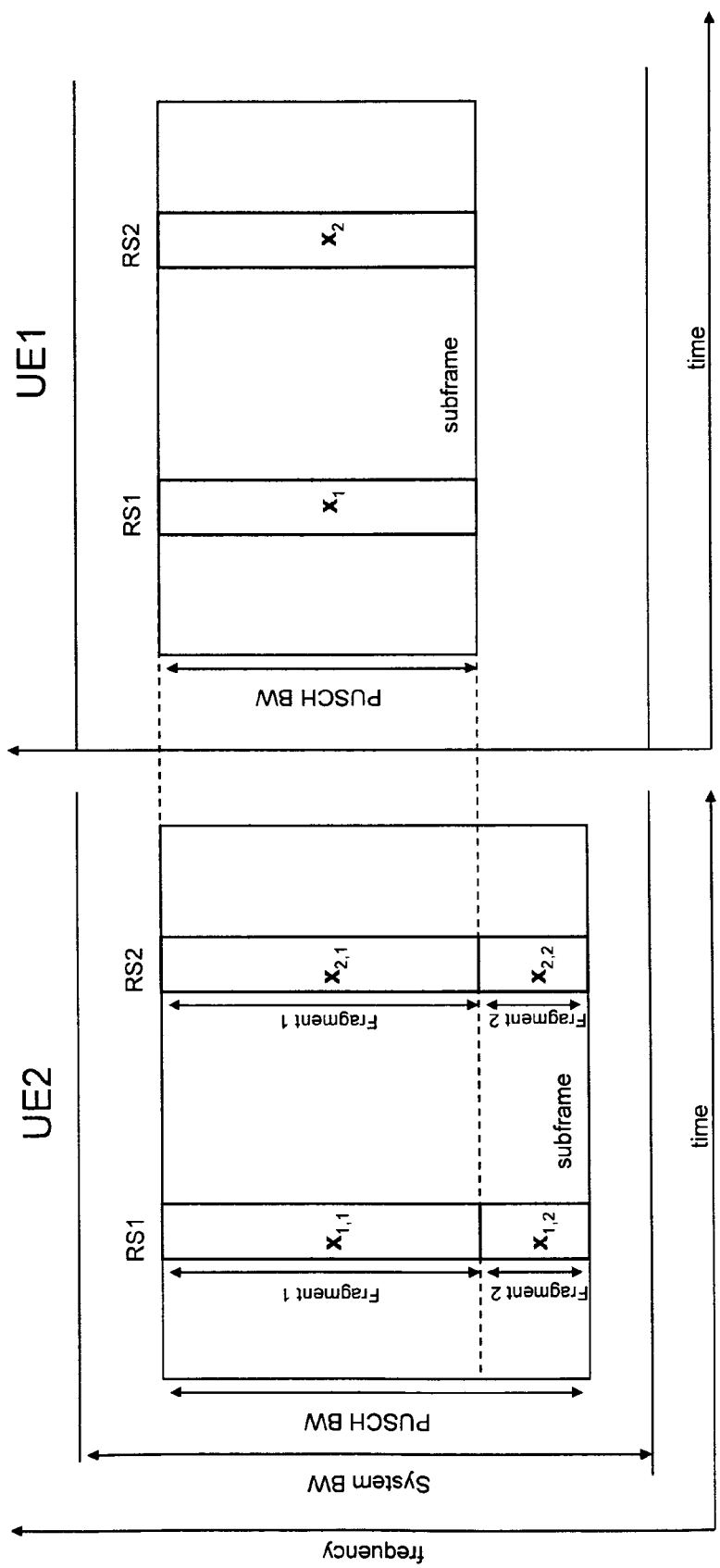

FIG. 6 illustrates a scenario in which the two user terminals UE1, UE2 using the non-fragmented (FIG. 5) and the fragmented (FIG. 6) reference signals are co-scheduled on partly overlapping transmission bandwidths. It should be noted that while FIG. 6 illustrates a scenario with two co-scheduled user terminals 20 (from any LTE Release), in principle an arbitrary number of user terminals 20 could be co-scheduled on partly overlapping bandwidths.

In the scenario of FIG. 6 it is assumed that user terminal UE1 is conforming to LTE Release 8, 9 or 10, employing the sub-frame configuration as illustrated in FIG. 4, while user terminal UE2 is configured as illustrated in FIG. 3 and employing the sub-frame configuration shown in FIG. 5. It is further assumed that user terminal UE1 is assigned base sequence A, while user terminal UE2 is assigned base sequences A and B. As also shown in FIG. 6, the PUSCH bandwidth utilized by user terminal UE1 corresponds in spectral size and spectral position to the portion of the PUSCH bandwidth utilized by mobile terminal UE2 that corresponds to fragments $x_{1,1}$ and $x_{2,1}$. When SGH is not enabled, base sequence A is used for generating the reference signal sequences associated with the fragments $x_1, x_2, x_{1,1}$ and $x_{2,1}$. To preserve orthogonality between the reference signal fragments transmitted by user terminal UE2 and the reference signals transmitted by user terminal UE1, conventional measures, such as utilizing different cyclic shifts or OCCs may be employed.

As illustrated in FIG. 6, the technique presented herein permits an unequal bandwidth pairing between two user terminals UE1, UE2, while preserving DMRS orthogonality. It should be observed that SGH may optionally be enabled for both user terminals UE1, UE2, while persevering orthogonality. This approach results in reduced reference signal interference while enabling unequal bandwidth allocation and, optionally, MU-MIMO even in case SGH is enabled. Further, scheduling flexibility for MU-MIMO is improved. Still further, MU-MIMO between user terminals conforming to LTE Release 11 and user terminals from previous LTE Releases is allowed, without having to disable SGH.

In the following, the signaling of spectral information defining the spectral sizes and spectral positions of the reference signal fragments illustrated in FIGS. 5 and 6 will be described in more detail with exemplary reference to the LTE standard and RIV field as presently used for resource allocation.

In the exemplary segmentation scenario illustrated in FIGS. 5 and 6 the RIV field may indicate a multi-set of three unordered values, such as a, b, c with a≤b≤c. The three unordered values may convey the spectral information in terms of LTE resource block indices. As an example, a indicates the first resource block index (in the frequency domain) for fragment 1, b, indicates the first resource block index for fragment 2, and c indicates the last resource block index for fragment 2 (with the assumption that the fragments 1 and 2 will be located immediately adjacent within the PUSCH bandwidth). Equivalently, b may indicate the last resource block index of fragment 1. It should be noted that instead of signaling PUSCH spectral positions, it would also be possible to signal a combination of spectral positions and spectral sizes (i.e., spectral bandwidth). If necessary, the granularity of the indices A, B and C may be increased in order to achieve overhead reduction.

In another example two unordered resource block indices (a, b, with a≤b) plus one independent index c spanning the whole range of the source block indices are jointly encoded in the RIV field. Instead of signaling PUSCH spectral positions it would also in this case be possible to signal a combination of spectral positions and spectral sizes (i.e., spectral bandwidth). The reduce complexity, the index c might alternatively be separately encoded. In order to reduce the signaling overhead, the indices a, b, and c may be quantized and indicated with different granularities.

In addition, swapping information (such as one or more "swapping bits") may be transmitted, for example in the RIV field, for changing the base sequence-to-fragment mapping. To enable a dynamic switching between DMRSs according to LTE Release 10 (i.e., non-fragmented DMRSs) and the fragmented DMRSs illustrated in FIGS. 5 and 6, a control instruction such as a mode flag may be transmitted from the base station 10 to the user terminals 20. The control instruction may be transmitted together with a scheduling grant (or otherwise) and may indicate that the scheduling grant should either be interpreted according to LTE Release 10 or other (i.e., in a non-fragmented case) or according to the technique presented herein (i.e, in a fragmented case).

In the following, various examples are discussed for calculating the mapping of base sequences to DMRS fragments and the PUSCH and fragment bandwidths.
if a<=c<=b
  1) assign PUSCH bandwidth edges as [a,b] (where a and b are resource block indexes the in frequency domain)
  2) fragment DMRS, where the two fragments are [a,c] and (c,b]
  3) map base sequence A to the first fragment and base sequence B to the second fragment
if c<a<=b
  1) assign PUSCH bandwidth edges as [c,b] (where a and b are resource block indexes in the frequency domain)
  2) fragment DMRS, where the 2 fragments are [c,a] and (a,b]
  3) map base sequence B to the first fragment and base sequence A to the second fragment
It should be observed that DMRS fragmentation is dynamically disabled by the following assignments:
if a<=c=b
  1) assign PUSCH bandwidth edges as [a,b] (where a and b are resource block indexes in the frequency domain)
  2) Use base sequence A
if c<a=b
  1) assign PUSCH bandwidth edges as [c,b] (where a and b are resource block indexes in the frequency domain)
  2) use base sequence B In case of fragmented DMRS allocation, the cyclic shift and OCC assignments may be common to all fragments of the same user terminal for reduced complexity reasons. Similarly, in case a specific base sequence is not explicitly configured for some of the fragments, the default base sequence employed in the non-fragmented case may be employed for all fragments.

As has become apparent from the above examples, the signalling of the spectral information for the fragmented DMRS to the user terminal 20 may be performed in an efficient way by jointly encoding the fragment edges together with the resource allocation (RIV) field, and optionally by implicitly deriving base sequence, cyclic shift and OCC allocation for all the fragments.

As has become apparent from the above description of exemplary embodiments, the technique presented herein generally permits to reduce reference signal interference and to enable a co-scheduling of multiple user terminals in time, frequency and space (e.g., MU-MIMO) dimensions with as few scheduling constraints as possible. In an exemplary LTE realization, user terminals of different LTE Releases can be co-scheduled without any difficulties, and in particular without disabling SGH. An interference reduction can be obtained even in case of unequal bandwidth allocations among the user terminals.

While the technique presented herein has been described with respect to particular embodiments, those skilled in the art will recognize that the present invention is not is limited to the specific embodiments described and illustrated herein. It is to be understood that the present disclosure is only illustrative. Accordingly, it is intended that the invention be limited only by the scope of the claims appended hereto.

The invention claimed is:

1. A method of generating a reference signal for use in a communication system in which for reference signal generation multiple base sequences are defined, the method comprising;
  generating a first reference signal sequence from a first base sequence;
  generating a second reference signal sequence from a second base sequence; and
  generating the reference signal comprising the first reference signal sequence and the second reference signal sequence, wherein generating the first reference signal sequence and the second reference signal sequence comprises applying at least one of a sequence group hopping pattern and a sequence-within-group hopping pattern to determine the first base sequence and the second base sequence respectively, wherein the first reference signal sequence occupies a first spectral fragment of the reference signal and the second reference signal sequence occupies a second spectral fragment of the reference signal, the second spectral fragment and the first spectral fragment are spectrally located immediately adjacent to one another and do not spectrally overlap.

2. The method of claim 1, further comprising:
  determining spectral information defining at least one of spectral sizes and spectral positions of the first spectral fragment and the second spectral fragment in a spectral bandwidth covered by the reference signal; and generating the reference signal taking into account the spectral information.

3. The method of claim 2, wherein the reference signal extends in a spectral dimension over at least one resource block, and the spectral information is defined by resource block indices.

4. The method of claim 2, wherein the spectral information is received in a resource allocation message that defines for a transmission channel of the reference signal at least one of a transmission channel bandwidth and a spectral position of the transmission channel.

5. The method of claim 1, wherein the reference signal has a spectral bandwidth that coincides with a transmission channel bandwidth that is used for data transmissions.

6. The method of claim 1, further comprising determining assignment information that assigns at least one of the first base sequence and the second base sequence to the respective spectral fragment.

7. The method of claim 6, wherein the assignment information is received in a resource allocation message that defines for a transmission channel of the reference signal at least one of a transmission channel bandwidth and a spectral position of the transmission channel.

8. The method of claim 1, wherein generating the first reference signal sequence and the second reference signal sequence comprises applying at least one of a cyclic shift and an orthogonal cover code to the first base sequence and the second base sequence, respectively.

9. The method of claim 1, wherein the first reference signal sequence is associated with at least one of a first sequence group hopping pattern and a first sequence-within-group hopping pattern; and
the second reference signal sequence is associated with at least one of a second sequence group hopping pattern and a second sequence-within-group hopping pattern different from the first sequence hopping pattern and the first sequence group hopping pattern, respectively.

10. The method of claim 1, further comprising:
generating a third reference signal sequence based on a third base sequence; and
generating another reference signal from the first reference signal sequence, the second reference signal sequence, and the third reference signal sequence, wherein the third reference signal sequence occupies a third spectral fragment of the reference signal, and wherein the third spectral fragment does not overlap with the first spectral fragment and the second spectral fragment.

11. A method of performing channel estimation based on a reference signal in a communication system in which for reference signal generation multiple base sequences are defined, the method comprising
receiving the reference signal comprising a first reference signal sequence generated from a first base sequence and a second reference signal sequence generated from a second base sequence, wherein generating the first reference signal sequence and the second reference signal sequence comprises applying at least one of a sequence group hopping pattern and a sequence-within-group hopping pattern to determine the first base sequence and the second base sequence respectively, wherein the first reference signal sequence occupies a first spectral fragment of the reference signal and the second reference signal sequence occupies a second spectral fragment of the reference signal, and the second spectral fragment and the first spectral fragment are spectrally located immediately adjacent to one another and do not spectrally overlap; and performing channel estimation based on the received reference signal and based on at least one of the first reference signal sequence and the second reference signal sequence.

12. The method of claim 11, wherein channel estimation comprises a matched filtering of the received reference signal, wherein the matched filtering is based on at least one of the first reference signal sequence and the second reference signal sequence.

13. The method of claim 11, further comprising:
allocating at least one of spectral sizes and spectral positions to the first spectral fragment and the second spectral fragment; and
transmitting spectral information indicative of the spectral allocation to a reference signal generator.

14. The method of claim 13, wherein the spectral information is transmitted via at least one scheduling grant.

15. The method of claim 11, further comprising
assigning at least one of the first base sequence and the second base sequence to the respective spectral fragment; and
transmitting assignment information indicative of the sequence assignment to a reference signal generator.

16. The method of claim 15, wherein the sequence assignment is performed semi-statically.

17. The method of claim 11, further comprising transmitting a control instruction to a reference signal generator, wherein the control instruction instructs the reference signal generator to switch from regular reference signalling in which another reference signal is generated from a single reference signal sequence to enhanced reference signalling in which the reference signal is generated from the first reference signal sequence and the second reference signal sequence.

18. The method of claim 11, further comprising co-scheduling a transmitter of a fragmented reference signal and a transmitter of a non-fragmented reference signal on at least partly overlapping transmission bandwidths, wherein the non-fragmented reference signal comprises a single reference signal sequence that has been generated from one of the first base sequence and the second base sequence.

19. A computer program product in a non-transitory computer storage medium comprising a program code portions for generating a reference signal for use in a communication system in which for reference signal generation multiple base sequences are defined, when the computer program product is executed by a processor on a computing device, the computing device:
generates a first reference signal sequence from a first base sequence, wherein generating the first reference signal sequence comprises applying at least one of a sequence group hopping pattern and a sequence-within-group hopping pattern to determine the first base sequence;
generates a second reference signal sequence from a second base sequence, wherein generating the second reference signal sequence comprises applying at least one of a sequence group hopping pattern and a sequence-within-group hopping pattern to determine the second base sequence; and
generates the reference signal comprising the first reference signal sequence and the second reference signal sequence, the first reference signal sequence occupies a first spectral fragment of the reference signal and the second reference signal sequence occupies a second spectral fragment of the reference signal, the second spectral fragment and the first spectral fragment do not overlap.

20. An apparatus for generating a reference signal for use in a communication system in which for reference signal generation multiple base sequences are defined, the apparatus comprising:
- a sequence generator configured to generate a first reference signal sequence from a first base sequence and a second reference signal sequence from a second base sequence, wherein generating the first reference signal sequence and the second reference signal sequence comprises applying at least one of a sequence group hopping pattern and a sequence-within-group hopping pattern to determine the first base sequence and the second base sequence respectively; and
- a reference signal generator configured to generate the reference signal comprising the first reference signal sequence and the second reference signal sequence,
- the first reference signal sequence occupies a first spectral fragment of the reference signal and the second reference signal sequence occupies a second spectral fragment of the reference signal, and the second spectral fragment and the first spectral fragment are spectrally located immediately adjacent to one another and do not spectrally overlap.

21. The apparatus of claim 20, wherein the apparatus is part of a user terminal.

22. An apparatus for performing channel estimation based on a reference signal in a communication system in which for reference signal generation multiple base sequences are defined, the apparatus comprising:
- a receiver configured to receive the reference signal comprising a first reference signal sequence generated from a first base sequence and a second reference signal sequence generated from a second base sequence, wherein generating the first reference signal sequence and the second reference signal sequence comprises applying at least one of a sequence group hopping pattern and a sequence-within-group hopping pattern to determine the first base sequence and the second base sequence respectively, wherein the first reference signal sequence occupies a first spectral fragment of the reference signal and the second reference signal sequence occupies a second spectral fragment of the reference signal, and the second spectral fragment and the first spectral fragment are spectrally located immediately adjacent to one another and do not spectrally overlap; and
- a channel estimator configured to perform channel estimation based on the received reference signal and based on at least one of the first reference signal sequence and the second reference signal sequence.

23. The apparatus of claim 22, wherein the apparatus is part of a base station.

24. A communication system comprising:
- at least one of an apparatus and a user terminal for generating a reference signal for use in the communication system in which for reference signal generation multiple base sequences are defined, the at least one of the apparatus and the user terminal including:
  - a sequence generator configured to generate a first reference signal sequence from a first base sequence and a second reference signal sequence from a second base sequence; and
  - a reference signal generator configured to generate the reference signal comprising the first reference signal sequence and the second reference signal sequence, wherein generating the first reference signal sequence and the second reference signal sequence comprises applying at least one of a sequence group hopping pattern and a sequence-within-group hopping pattern to determine the first base sequence and the second base sequence respectively, wherein the first reference signal sequence occupies a first spectral fragment of the reference signal and the second reference signal sequence occupies a second spectral fragment of the reference signal, and the second spectral fragment and the first spectral fragment are spectrally located immediately adjacent to one another and do not spectrally overlap; and
- at least one of a second apparatus and a base station for performing channel estimation based on a reference signal in a communication system in which for reference signal generation multiple base sequences are defined, the at least one of the second apparatus and the base station including:
  - a receiver configured to receive a reference signal comprising a first reference signal sequence generated from a first base sequence and a second reference signal sequence generated from a second base sequence, wherein generating the first reference signal sequence and the second reference signal sequence comprises applying at least one of a sequence group hopping pattern and a sequence-within-group hopping pattern to determine the first base sequence and the second base sequence respectively, wherein the first reference signal sequence occupies a first spectral fragment of the reference signal and the second reference signal sequence occupies a second spectral fragment of the reference signal, and the second spectral fragment and the first spectral fragment are spectrally located immediately adjacent to one another and do not spectrally overlap; and
  - a channel estimator configured to perform channel estimation based on the received reference signal and based on at least one of the first reference signal sequence and the second reference signal sequence.

25. The communication system of claim 24, wherein the communication system is configured to operate in accordance with one of Long Term Evolution Release 10 and 11.

* * * * *